United States Patent
Lin (10) Patent No.: US 12,426,097 B2
(45) Date of Patent: Sep. 23, 2025

(54) COMMUNICATION DEVICE AND METHOD OF TRANSMISSION OF SAME

(71) Applicant: GUANGDONG OPPO MOBILE TELECOMMUNICATIONS CORP., LTD., Guangdong (CN)

(72) Inventor: Hao Lin, Neuilly sur Seine (FR)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 264 days.

(21) Appl. No.: 17/994,915

(22) Filed: Nov. 28, 2022

(65) Prior Publication Data

US 2023/0107364 A1    Apr. 6, 2023

Related U.S. Application Data (63) Continuation of application No. PCT/IB2020/000792, filed on May 29, 2020.

(51) Int. Cl.
| | |
|---|---|
| *H04W 74/0833* | (2024.01) |
| *H04L 5/00* | (2006.01) |
| *H04W 74/00* | (2009.01) |

(52) U.S. Cl.
CPC ....... *H04W 74/0841* (2013.01); *H04L 5/0053* (2013.01); *H04W 74/002* (2013.01)

(58) Field of Classification Search
CPC ............ H04W 74/0841; H04W 74/002; H04L 5/0053; H04L 1/1858; H04L 1/1896; H04L 1/08
See application file for complete search history.

(56) References Cited

U.S. PATENT DOCUMENTS

| | | | |
|---|---|---|---|
| 2011/0164662 A1 | 7/2011 | Kishiyama | |
| 2011/0274142 A1* | 11/2011 | Miki | H04L 1/1893 375/147 |
| 2014/0126491 A1* | 5/2014 | Ekpenyong | H04L 1/1854 370/329 |

(Continued)

OTHER PUBLICATIONS

CAICT, "Considerations on transmission type and HARQ feedback timing for multiple SL grants", 3GPP TSG RAN WG1 Meeting #96bis, R1-1905420, Apr. 2019 Xi'an, China, Apr. 8-12, 2019, all pages.

(Continued)

*Primary Examiner* — Ayaz R Sheikh
*Assistant Examiner* — Tarell A Hampton
(74) *Attorney, Agent, or Firm* — Ladas & Parry, LLP (57) ABSTRACT

A communication device and a method of transmission of the same are provided. The method includes receiving a first transmission and a second transmission from a first communication device and transmitting a first feedback of the first transmission and a second feedback of the second transmission to the first communication device, wherein the first feedback and the second feedback are transmitted in a third transmission. This can solve issues in the prior art that feedback information cannot be transmitted due to channel being busy when performing sidelink in unlicensed spectrum, provide a method of acknowledgement feedback in sidelink for unlicensed system, and provide a method of allowing a second device to retransmit a first feedback in a next time when the second device transmits another feedback to the same first device.

16 Claims, 7 Drawing Sheets

(56) References Cited

U.S. PATENT DOCUMENTS

| | | | |
|---|---|---|---|
| 2016/0095093 A1* | 3/2016 | Yi | H04L 5/001 370/280 |
| 2017/0215172 A1* | 7/2017 | Yang | H04L 27/2601 |
| 2017/0273056 A1* | 9/2017 | Papasakellariou | H04W 52/44 |
| 2019/0058516 A1* | 2/2019 | Yang | H04L 27/2666 |
| 2019/0327030 A1* | 10/2019 | Yoshimoto | H04L 1/0061 |
| 2020/0099479 A1* | 3/2020 | Park | H04W 4/70 |

OTHER PUBLICATIONS

ITL, "Physical layer procedure for NR V2X", 3GPP TSG RAN WG1 #98bis R1-1910797, Chongqing, China, Oct. 14-20, 2019, all pages.
Huawei, HiSilicon, "Sidelink physical layer structure for NR V2X", 3GPP TSG RAN WG1 Meeting #98bis, R1-1910054, Chongqing, China, Oct. 14-20, 2019, all pages.
International Search Report in the international application No. PCT/IB2020/000792, mailed on Feb. 23, 2021.
Written Opinion of the International Search Authority in the international application No. PCT/IB2020/000792, mailed on Feb. 23, 2021.
First Office Action of the corresponding European application No. 20808499.6, issued on Feb. 25, 2025.

* cited by examiner

FIG. 9 channel access failure

FIG. 10 channel access failure

FIG. 14 from the 1st device view from the 2nd device view

COMMUNICATION DEVICE AND METHOD OF TRANSMISSION OF SAME

CROSS-REFERENCE TO RELATED APPLICATION

The present application is a continuation of International Application No. PCT/IB2020/000792 filed on May 29, 2020, the disclosure of which is hereby incorporated by reference in its entirety.

BACKGROUND OF DISCLOSURE

1. Field of the Disclosure

The present disclosure relates to the field of communication systems, and more particularly, to a communication device and a method of transmission of the same, which can provide a good communication performance and high reliability.

2. Description of the Related Art

Device-to-device communication is a D2D-based sidelink (SL) transmission technology, which is different from a conventional cellular system in that communication data is received or sent through a base station, so it has a higher spectrum efficiency and lower transmission delay. The car-to-vehicle system adopts a D2D direct communication method, and 3GPP defines two transmission modes: a first mode and a second mode.

Figure 1:
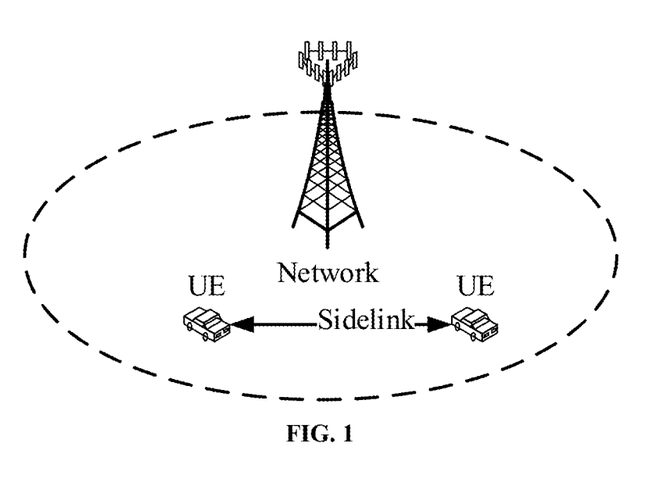
FIG. 1 is a schematic diagram illustrating sidelink communication in a coverage of a network.

The first mode: transmission resources of a terminal are allocated by the base station, and the terminal sends data on side-link according to the resources allocated by the base station. The base station can allocate the resources for a single transmission to the terminal, or can allocate semi-static transmission for the terminal resources. FIG. 1 illustrates sidelink communication in a coverage of a network. As illustrated in FIG. 1, a terminal (such as a user equipment, UE) is located within the coverage of the network, and the network allocates transmission resources used by the terminal for side transmission.

In new radio vehicle-to-everything (NR-V2X), it is necessary to support automatic driving, so it puts forward higher requirements for data interaction between vehicles, such as higher throughput, lower delay, higher reliability, greater coverage, more flexible resource allocation, etc.

Figure 2:
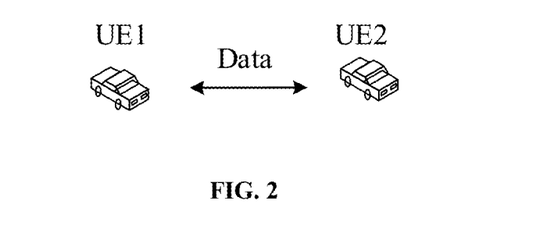
FIG. 2 is a schematic diagram illustrating sidelink unicast transmission.
Figure 3:
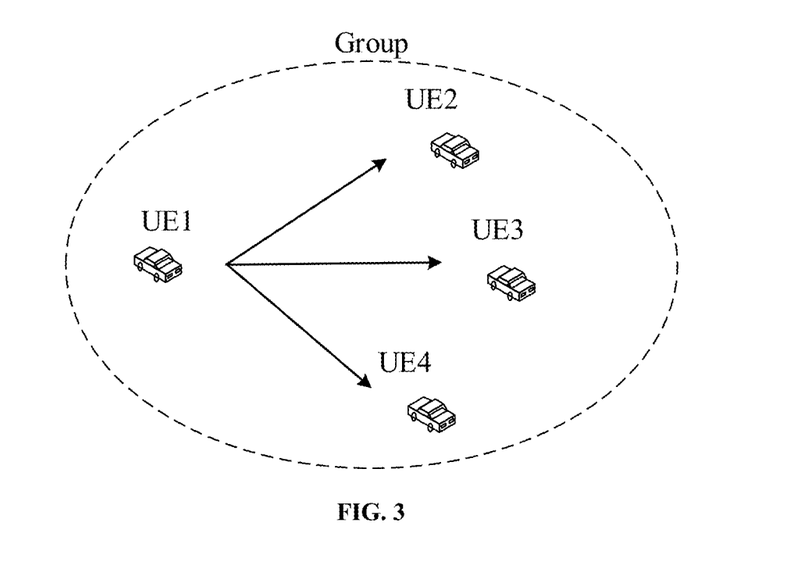
FIG. 3 is a schematic diagram illustrating sidelink multicast transmission.
Figure 4:
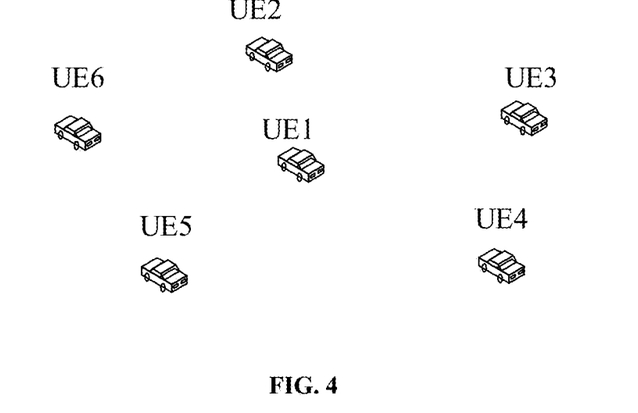
FIG. 4 is a schematic diagram illustrating sidelink broadcast transmission.

In long term evolution (LTE)-V2X, broadcast transmission is supported. In NR-V2X, unicast and multicast transmission methods are introduced. For unicast transmission, there is only one terminal at the receiving end. As illustrated in FIG. 2, unicast transmission is performed between UE1 and UE2. For multicast transmission, the receiving end is all terminals in a communication group, or is in a certain transmission. All terminals within the distance, as illustrated in FIG. 3, UE1, UE2, UE3, and UE4 form a communication group, in which UE1 sends data, the other terminal devices (UE2, UE3, and UE4) in the group are all receiving terminals. For broadcast transmission, as illustrated in FIG. 4, UE1 is the sending terminal, and other terminals (UE2, UE3, UE4, UE5, and UE6) around UE1 are all receiving terminals.

In an unlicensed band, an unlicensed spectrum is a shared spectrum. Communication equipments in different communication systems can use the unlicensed spectrum as long as the unlicensed meets regulatory requirements set by countries or regions on a spectrum. There is no need to apply for a proprietary spectrum authorization from a government.

In order to allow various communication systems that use the unlicensed spectrum for wireless communication to coexist friendly in the spectrum, some countries or regions specify regulatory requirements that must be met to use the unlicensed spectrum. For example, a communication device follows a listen before talk (LBT) procedure, that is, the communication device needs to perform a channel sensing before transmitting a signal on a channel. When an LBT outcome illustrates that the channel is idle, the communication device can perform signal transmission; otherwise, the communication device cannot perform signal transmission. In order to ensure fairness, once a communication device successfully occupies the channel, a transmission duration cannot exceed a maximum channel occupancy time (MCOT).

On an unlicensed carrier, for a channel occupation time obtained by a base station, it may share the channel occupation time to a user equipment (UE) for transmitting an uplink signal or an uplink channel. In other words, when the base station shares its own channel occupancy time with the UE, the UE can use an LBT mode with higher priority than that used by the UE itself to obtain the channel, thereby obtaining the channel with greater probability.

When a base station (such as a gNB) schedules physical uplink shared channel (PUSCH) or pre-configures PUSCH resources, the PUSCH resources might not be in the gNB's COT. In this case, a UE will perform LBT category 4, that is Type 1 uplink (UL) channel access. But later, when the gNB obtains a new COT before the scheduled or pre-configured PUSCH occurs, the gNB can share the COT with the UE, then UE might be able to adapt its LBT category from Cat4 to Cat2. Equipment using the unlicensed band is classified into frame based equipment (FBE) or load based equipment (LBE). the FBE does less damage to neighboring Wi-Fi devices sharing an unlicensed band, compared to the LBE. Generally, the LBE is more likely to occupy the unlicensed band than the FBE. This is because the Wi-Fi device is taking more chances to occupy the unlicensed band. In the 3GPP standard, an FBE scheme is referred to as CAT2 LBT and an LBE scheme is referred to as CAT4 LBT.

In the prior art, feedback information cannot be transmitted due to channel being busy when performing sidelink in unlicensed spectrum. A method of acknowledgement feedback in sidelink for unlicensed system is still an open issue. Therefore, there is a need for a communication device and a method of transmission of the same, which can solve issues in the prior art that feedback information cannot be transmitted due to channel being busy when performing sidelink in unlicensed spectrum, provide a method of acknowledgement feedback in sidelink for unlicensed system, and provide a method of allowing a second device to retransmit a first feedback in a next time when the second device transmits another feedback to the same first device.

SUMMARY

An object of the present disclosure is to propose a communication device and a method of transmission of the same.

In a first aspect of the present disclosure, a method of transmission of a communication device includes receiving a first transmission and a second transmission from a first communication device and transmitting a first feedback of the first transmission and a second feedback of the second transmission to the first communication device, wherein the first feedback and the second feedback are transmitted in a third transmission.

In a second aspect of the present disclosure, a communication device includes a memory, a transceiver, and a processor coupled to the memory and the transceiver. The processor is configured to control the transceiver to: receive a first transmission and a second transmission from a first communication device and transmit a first feedback of the first transmission and a second feedback of the second transmission to the first communication device, wherein the first feedback and the second feedback are transmitted in a third transmission.

In a third aspect of the present disclosure, a method of transmission of a communication device includes transmitting a first transmission and a second transmission to a second communication device and receiving a first feedback of the first transmission and a second feedback of the second transmission from the second communication device, wherein the first feedback and the second feedback are received in a third transmission.

In a fourth aspect of the present disclosure, a communication device includes a memory, a transceiver, and a processor coupled to the memory and the transceiver. The processor is configured to control the transceiver to: transmit a first transmission and a second transmission to a second communication device and receive a first feedback of the first transmission and a second feedback of the second transmission from the second communication device, wherein the first feedback and the second feedback are received in a third transmission.

BRIEF DESCRIPTION OF DRAWINGS

In order to illustrate the embodiments of the present disclosure or related art more clearly, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION OF EMBODIMENTS

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

Sidelink Feedback☐

Figure 5:
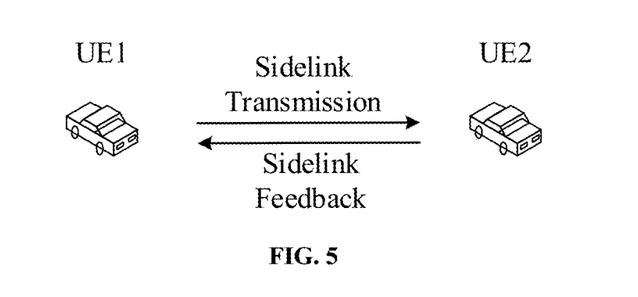
FIG. 5 is a schematic diagram illustrating sidelink transmission and sidelink feedback.

FIG. 5 illustrates that, in some embodiments, sidelink transmission is performed from UE1 to UE2, and sidelink feedback is performed from UE2 to UE1. In new radio vehicle-to-everything (NR-V2X), in order to improve reliability, a side feedback channel is introduced. For example, for unicast transmission, a sending terminal sends side data (including physical sidelink control channel, PSCCH and physical sidelink shared channel, PSSCH) to a receiving terminal, the receiving terminal sends hybrid automatic repeat request (HARQ) feedback information (including an acknowledgement, ACK, or a negative acknowledgement, NACK) to the sending terminal. The sending terminal determines whether retransmission is required based on the HARQ feedback information. Among them, the HARQ feedback information is carried in a side feedback channel, such as physical sidelink feedback channel (PSFCH).

The side feedback can be activated or deactivated through pre-configuration information or network configuration information. If the side feedback is activated, the receiving terminal receives the side data sent by the sending terminal and feeds back HARQ ACK or NACK to the sending terminal according to the detection result, The sending terminal decides to send retransmission data or new data based on the feedback information of the receiving terminal. If the side feedback is deactivated, the receiving terminal does not need to send feedback information. The sending terminal usually sends data by blind retransmission, for example the sending terminal repeatedly sends K times for each side data instead of deciding whether to send retransmission data based on the feedback information of the receiving terminal.

Figure 6:
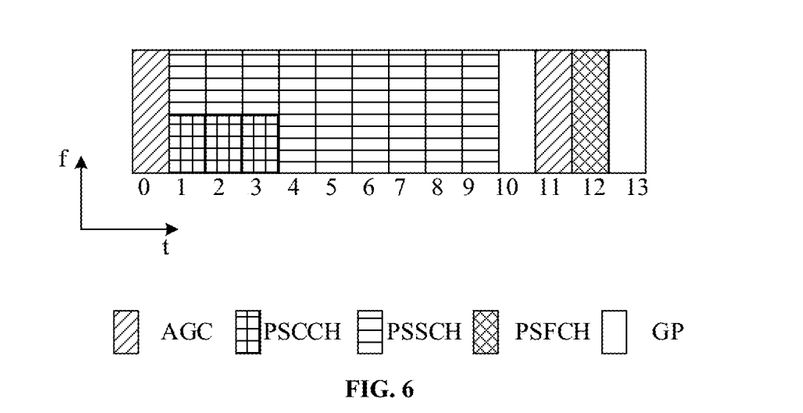
FIG. 6 is a schematic diagram illustrating PSFCH and PSCCH/PSSCH structures in a slot.

Sidelink Feedback Channel Format:

FIG. 6 illustrates that, in some embodiments, PSFCH and PSCCH/PSSCH structures in a slot are provided. In NR-V2X, the side feedback channel PSFCH is introduced. The PSFCH only carries 1 bit of HARQ-ACK information and occupies 2 time domain symbols in the time domain (the second symbol carries side feedback information, the first data on the symbol is a copy of the data on the second symbol, but the symbol is used as an automatic gain control, AGC), occupying 1 PRB in the frequency domain. In a slot, structures of PSFCH and PSSCH/PSCCH is illustrated in FIG. 6. FIG. 6 illustrates that, in some embodiments, the position of the time domain symbol is occupied by PSFCH, PSCCH, and PSSCH in a slot. In the slot, the last symbol is used as a guard period (GP), the penultimate symbol is used for PSFCH transmission, the data of the penultimate symbol is the same as the data of the PSFCH symbol, used as AGC, and the penultimate symbol is also used as GP, The first symbol in the time slot is used as an AGC. The data on the symbol is the same as the data on the second time-domain symbol in the time slot. The PSCCH occupies 3 time-domain symbols, and the remaining symbols can be used for PSSCH transmission.

Figure 7:
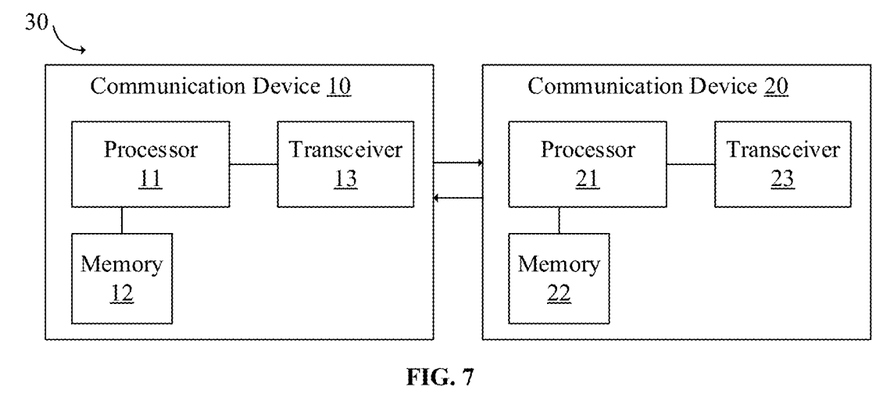
FIG. 7 is a block diagram of communication devices of communication in a communication network system according to an embodiment of the present disclosure.

FIG. 7 illustrates that, in some embodiments, a communication device 10 and a communication device 20 of communication in a communication network system 30 according to an embodiment of the present disclosure are provided. The communication network system 30 includes the communication device 10 the communication device 20. The communication device 10 may include a memory 12, a transceiver 13, and a processor 11 coupled to the memory 12, the transceiver 13. The communication device 20 may include a memory 22, a transceiver 23, and a processor 21 coupled to the memory 22, the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of first information to operate the processor 11 or 21. The transceiver 13 or 23 is operatively coupled with the processor 11 or 21, and the transceiver 13 or 23 transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

The communication between UEs relates to vehicle-to-everything (V2X) communication including vehicle-to-vehicle (V2V), vehicle-to-pedestrian (V2P), and vehicle-to-infrastructure/network (V2I/N) according to a sidelink technology developed under 3rd generation partnership project (3GPP) long term evolution (LTE) and new radio (NR) Release 16 and beyond. UEs are communicated with each other directly via a sidelink interface such as a PC5 interface. Some embodiments of the present disclosure relate to sidelink communication technology in 3GPP NR release 16 and beyond.

In some embodiments, the processor 11 is configured to control the transceiver 13 to: receive a first transmission and a second transmission from the communication device 20 and transmit a first feedback of the first transmission and a second feedback of the second transmission to the communication device 20, wherein the first feedback and the second feedback are transmitted in a third transmission. This can solve issues in the prior art that feedback information cannot be transmitted due to channel being busy when performing sidelink in unlicensed spectrum, provide a method of acknowledgement feedback in sidelink for unlicensed system, and provide a method of allowing a second device to retransmit a first feedback in a next time when the second device transmits another feedback to the same first device.

In some embodiments, the processor 21 is configured to control the transceiver 23 to: transmit a first transmission and a second transmission to the communication device 10 and receive a first feedback of the first transmission and a second feedback of the second transmission from the communication device 10, wherein the first feedback and the second feedback are received in a third transmission. This can solve issues in the prior art that feedback information cannot be transmitted due to channel being busy when performing sidelink in unlicensed spectrum, provide a method of acknowledgement feedback in sidelink for unlicensed system, and provide a method of allowing a second device to retransmit a first feedback in a next time when the second device transmits another feedback to the same first device.

Figure 8:
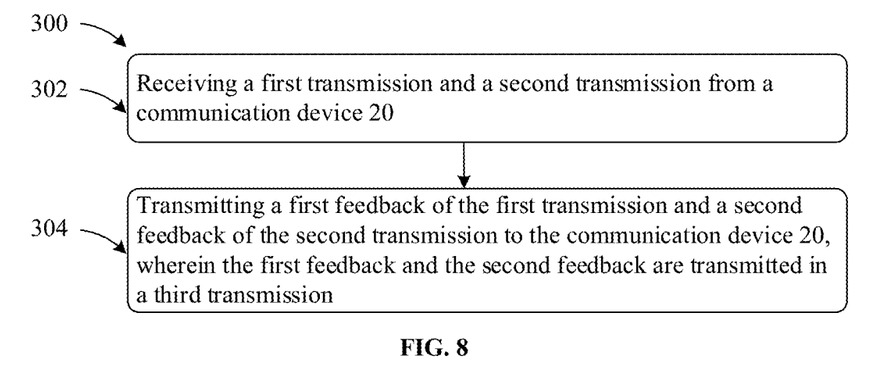
FIG. 8 is a flowchart illustrating a method of transmission of a communication device according to an embodiment of the present disclosure.

FIG. 8 illustrates a method 300 of transmission of a communication device according to an embodiment of the present disclosure. In some embodiments, the method 300 includes: a block 302, receiving a first transmission and a second transmission from a communication device 20, and a block 304, transmitting a first feedback of the first transmission and a second feedback of the second transmission to the communication device 20, wherein the first feedback and the second feedback are transmitted in a third transmission. This can solve issues in the prior art that feedback information cannot be transmitted due to channel being busy when performing sidelink in unlicensed spectrum, provide a method of acknowledgement feedback in sidelink for unlicensed system, and provide a method of allowing a second device to retransmit a first feedback in a next time when the second device transmits another feedback to the same first device.

Figure 9:
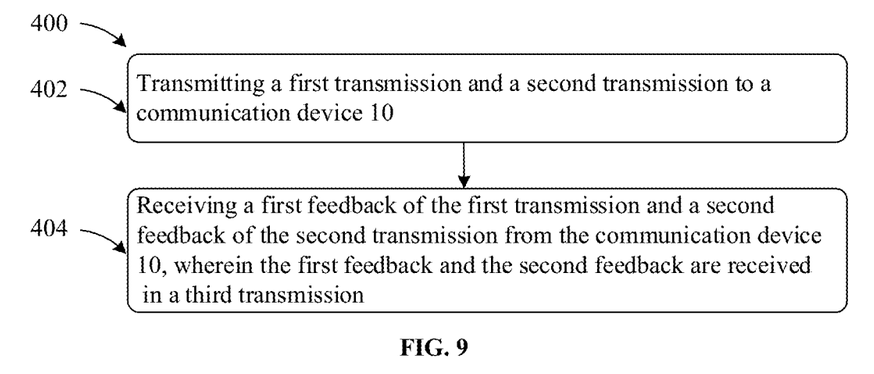
FIG. 9 is a flowchart illustrating a method of transmission of a communication device according to an embodiment of the present disclosure.

FIG. 9 illustrates a method 400 of transmission of a communication device according to an embodiment of the present disclosure. In some embodiments, the method 400 includes: a block 402, transmitting a first transmission and a second transmission to a communication device 10, and a block 404, receiving a first feedback of the first transmission and a second feedback of the second transmission from the communication device 10, wherein the first feedback and the second feedback are received in a third transmission. This can solve issues in the prior art that feedback information cannot be transmitted due to channel being busy when performing sidelink in unlicensed spectrum, provide a method of acknowledgement feedback in sidelink for unlicensed system, and provide a method of allowing a second device to retransmit a first feedback in a next time when the second device transmits another feedback to the same first device.

In some embodiments, the first transmission is the last transmission received by the communication device 10 prior to the second transmission. In some embodiments, the first transmission is the last transmission transmitted by the communication device 20 prior to the second transmission. In some embodiments, the first transmission is located in a first set of resources, and the first set of resources is indicated by a first control information. In some embodiments, the first control information comprises a first indication field, and the first indication field is relevant to the third transmission. In some embodiments, the second transmission is located in a second set of resources, and the second set of resources is indicated by a second control information. In some embodiments, the second control information comprises a second indication field, and the second indication field is relevant to the third transmission.

In some embodiments, the first transmission and/or the second transmission comprises at least one of the following: a physical sidelink shared channel (PSSCH); a physical sidelink control channel (PSCCH); a physical downlink shared channel (PDSCH); a physical uplink shared channel (PUSCH); a channel state information reference signal (CSI-RS); or a sounding reference signal (SRS). In some embodiments, the first feedback and/or the second feedback comprises at least one of the following: an information relevant to an acknowledgement of transmission reception; a channel state information; or a reference signal resource indication. In some embodiments, the third transmission comprises a first acknowledgement corresponding to the first transmission and/or a second acknowledgement corresponding to the second transmission. In some embodiments, the first acknowledgement is relevant to the first indication field and/or the second indication field. In some embodiments, the first acknowledgement comprises ACK or NACK. In some embodiments, the second acknowledgement comprises ACK or NACK. In some embodiments, the first acknowledgement is a negative acknowledgement (NACK) when the first indication field and the second indication field indicate a same value. In some embodiments, the same value comprises 0 or 1. In some embodiments, the first acknowledgement is a NACK or an acknowledgement (ACK) when the first indication field and the second indication field indicate different values. In some embodiments, the first acknowledgement is an ACK, if the first transmission is correctly received by the communication device 10, or otherwise the first acknowledgement is a NACK. In some embodiments, the second acknowledgement is an ACK, if the second transmission is correctly received by the communication device 10, or otherwise the second acknowledgement is a NACK. In some embodiments, the third transmission comprises at least one of the following: a physical sidelink feedback channel (PSFCH); a physical uplink control channel (PUCCH); a physical uplink shared channel (PUSCH); or a physical downlink control channel (PDCCH). In some embodiments, the PSFCH or the PUCCH comprises a sequence, and the sequence corresponds to the first acknowledgement and/or the second acknowledgement.

In some embodiments, the sequence is selected among more than one candidate sequences, and the candidate sequences correspond to an acknowledgement status. In some embodiments, the third transmission is located in a third set of resources. In some embodiments, the third set of resources is relevant to the second set of resources. In some embodiments, the third set of resources is associated with the second set of resources, where the association is pre-configured or pre-defined. In some embodiments, the third set of resources is indicated by the second control information. In some embodiments, the first set of resources and/or the second set of resources and/or the third set of resources comprises at least one symbol in time domain and at least one resource block in frequency domain.

In some embodiments, the communication device 10 and/or the communication device 20 comprises a user equipment, or a base station, or a spaceborne.

Example

Figure 10:
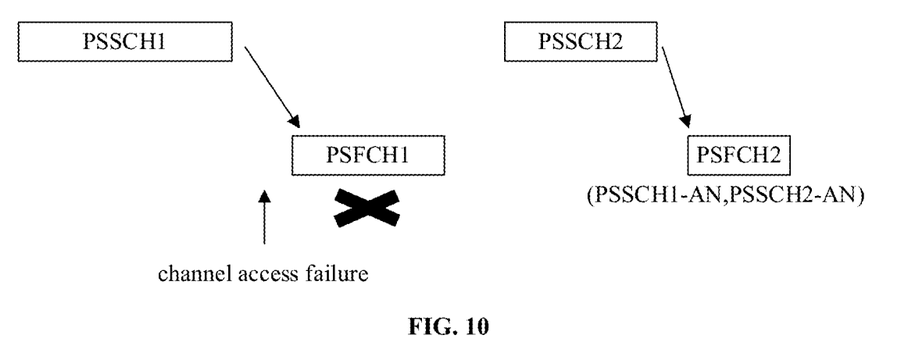
FIG. 10 is a schematic diagram illustrating an example of sidelink feedback according to an embodiment of the present disclosure.

FIG. 10 illustrates an example of sidelink feedback according to an embodiment of the present disclosure. FIG. 10 illustrates that, in some embodiments, a first device transmits a first transmission to a second device, and the first device expects a first feedback to the first transmission from the second device. If the transmission is performed in unlicensed spectrum (or shared spectrum), the second device needs to perform channel access procedure before transmitting the first feedback to the first device. However, if the channel is busy, the second device cannot transmit the first feedback to the first device. Some embodiments of the present disclosure present a method of allowing the second device to retransmit the first feedback in a next time when the second device transmits another feedback to the same first device. In an example, the second device transmits one or more acknowledgements to the first device. The acknowledgements are ACK or NACK (AN) of transmission receptions from the first device, and in an example, the example assumes that the first and the second transmissions are physical sidelink shard channel (PSSCH).

FIG. 10 illustrates that, in some embodiments, feedback in PSSCH1-AN in PSFCH1 is not transmitted due to channel access failure (channel is busy). In this next PSFCH2, the feedback PSSCH1-AN is retransmitted. In some embodiments, from the second device point of view, the second device receives a first PSSCH (PSSCH1) from the first device, and the AN acknowledgement of the PSSCH1 is expected to be transmitted in PSFCH1. When the second device performs a channel access procedure and it turns out that the channel is busy. The PSFCH1 cannot be transmitted. Later, the second device receives a second PSSCH (PSSCH2) from the first device, and the AN acknowledgement of the PSSCH2 is expected to be transmitted in PSFCH2. Some embodiments of the present disclosure present a method that the second device will feedback the AN acknowledgement of both PSSCH1 and PSSCH2 in PSFCH2. With this method, it is to say that the AN acknowledgement of PSSCH1 is retransmitted in PSFCH2. Thus, it can reduce the probability that the first device cannot obtain the feedback from the second device due to channel access failure.

Figure 11:
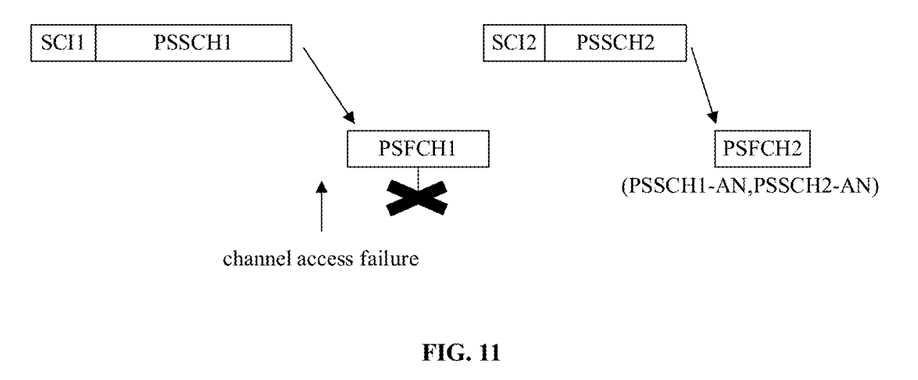
FIG. 11 is a schematic diagram illustrating an example that PSSCH is scheduled by SCI, optionally PSFCH is scheduled by SCI according to an embodiment of the present disclosure.

FIG. 11 illustrates that, in some embodiments, PSSCH is scheduled by sidelink control information (SCI), optionally PSFCH is scheduled by SCI. The PSSCH1 and PSSCH2 are transmitted in a first set of resources and a second set of resources, respectively. The first set of resources and/or the second set of resources comprises at least one symbol in time domain and at least one resource blocks in frequency domain. The first set of resources is indicated by a first control information, called sidelink control information (SCI1). The second set of resources is indicated by a second control information (SCI2). Optionally, The SCI1 is transmitted together with PSSCH1 and the SCI2 is transmitted together PSSCH2.

Figure 12:
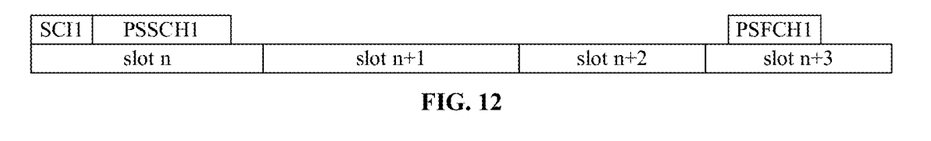
FIG. 12 is a schematic diagram illustrating an example that PSFCH resource is associated with SCI or PSSCH resource according to an embodiment of the present disclosure.

FIG. 12 illustrates that, in some embodiments, PSFCH resource is associated with SCI or PSSCH resource. For PSSCH1, the AN feedback (PSSCH1-AN) is to be transmitted in PSFCH1, where the PSFCH1 is located in a third set of resources. The third set of resources comprises at least one symbol in time domain and at least one RB in frequency domain. Moreover, the third set of resources is indicated by SCI1. Optionally the third set of resources have pre-configured or pre-defined association with the first set of resources, in which the PSSCH1 is located. One example of such association is that PSFCH1 is located in 3th slots after the slot in which the PSSCH1 is located, and PSFCH1 is located in the pre-defined symbol within the slot. Moreover, the PSFCH1 has the same RB index as the PSSCH1. In this case, once the first set of resources is determined, the third set of resource are also determined.

Figure 13:
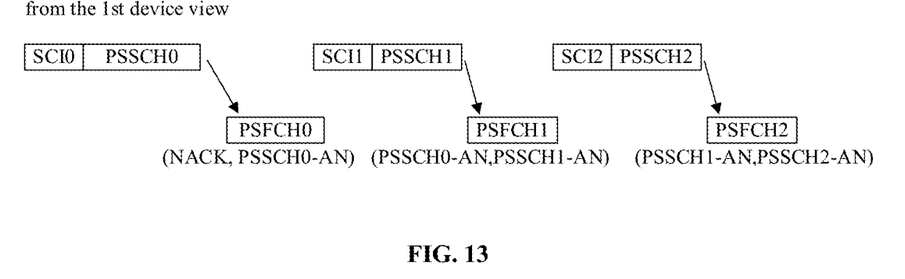
FIG. 13 is a schematic diagram illustrating an example of sidelink feedback according to an embodiment of the present disclosure.

FIG. 13 illustrates that, in some embodiments, in each PSFCH, the feedback includes the AN of the current PSSCH and the latest PSSCH prior to the current PSSCH. If the second device cannot transmit PSSCH1-AN due to channel access failure, the PSSCH1-AN can be retransmitted in the next feedback channel. In an example, when the second device receives a second PSSCH (PSSCH2) scheduled by a second control information (SCI2). The AN feedback of PSSCH2 (PSSCH2-AN) will be transmitted in PSFCH2, and at the same time the PSSCH1-AN will also be retransmitted in PSFCH2. Thus, in PSFCH2, the second device will report {PSSCH1-AN, PSSCH2-AN}. The design principle is that when the second device receives a PSSCH2, the second device will transmit in the corresponding PSFCH2 the AN feedback of the currently received PSSCH2 and the AN feedback of the latest received PSSCH prior to the currently received PSSCH2, i.e. in an example, PSSCH1. The same mechanism is applied for the next PSSCH reception, e.g. if the second device receives later PSSCH3, the second device will transmit PSSCH3-AN and PSSCH2-AN in PSFCH3, and so on. It is to note that if the PSSCH0 is the earliest received PSSCH from the first device, the AN of the latest PSSCH prior to PSSCH0 is set to NACK.

Figure 14:
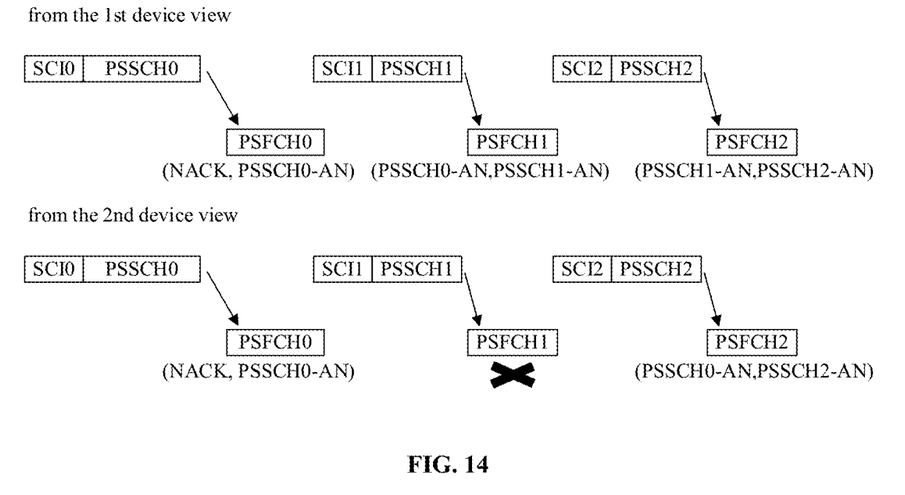
FIG. 14 is a schematic diagram illustrating an example of sidelink feedback according to an embodiment of the present disclosure.

FIG. 14 illustrates that, in some embodiments, from transmitter and receiver sides, there is ambiguity about who the latest PSSCH is. When one of the transmitted SCI and PSSCH are missed by the receiver. In some cases, there is an issue that the first device and the second device have ambiguity on who is the latest PSSCH prior to PSSCH2. For example, as illustrated in FIG. 14, the first device sends three PSSCHs, i.e. PSSCH0, PSSCH1, and PSSCH2. But the second device only receives PSSCH0 and PSSCH2, and the PSSCH1 is missed by the second device. In this case, from the first device perspective, the latest PSSCH prior to PSSCH2 is PSSCH1; while from the second device perspective, the latest PSSCH prior to PSSCH2 is PSSCH0.

To solve this issue, when the second device reports the AN feedback of the current PSSCH and the latest PSSCH prior to the current PSSCH, if the AN of the latest PSSCH has been transmitted, the AN of the latest PSSCH is set to NACK. In an example, if PSSCH1-AN is transmitted in PSFCH1, then the second device will report {NACK, PSSCH2-AN} in PSFCH2, otherwise, the second device will report {PSSCH1-AN, PSSCH2-AN} in PSFCH2.

Figure 15:
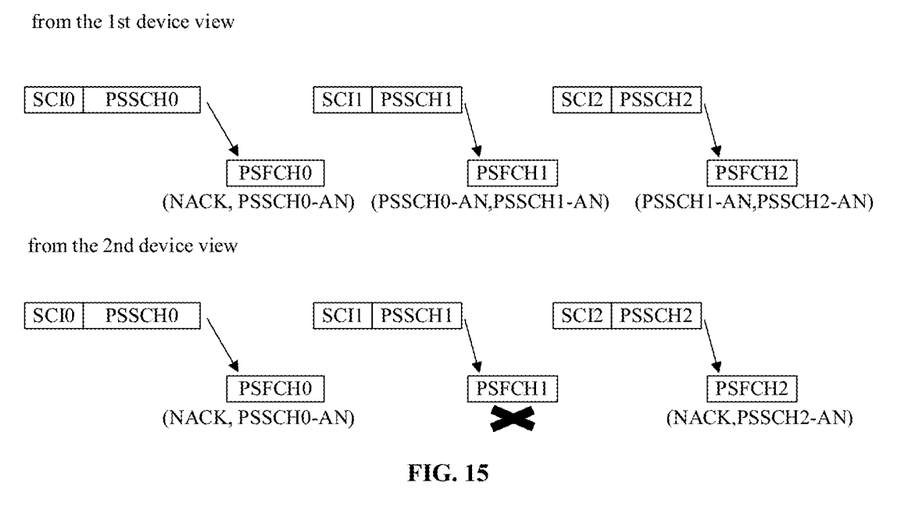
FIG. 15 is a schematic diagram illustrating an example of sidelink feedback according to an embodiment of the present disclosure.

FIG. 15 illustrates that, in some embodiments, when the second device reports the AN feedback of the current PSSCH and the latest PSSCH prior to the current PSSCH, if the AN of the latest PSSCH has been transmitted, the AN of the latest PSSCH is set to NACK. In an example, if PSSCH1-AN is transmitted in PSFCH1, then the second device will report {NACK, PSSCH2-AN} in PSFCH2, otherwise, the second device will report {PSSCH1-AN, PSSCH2-AN} in PSFCH2.

Figure 16:
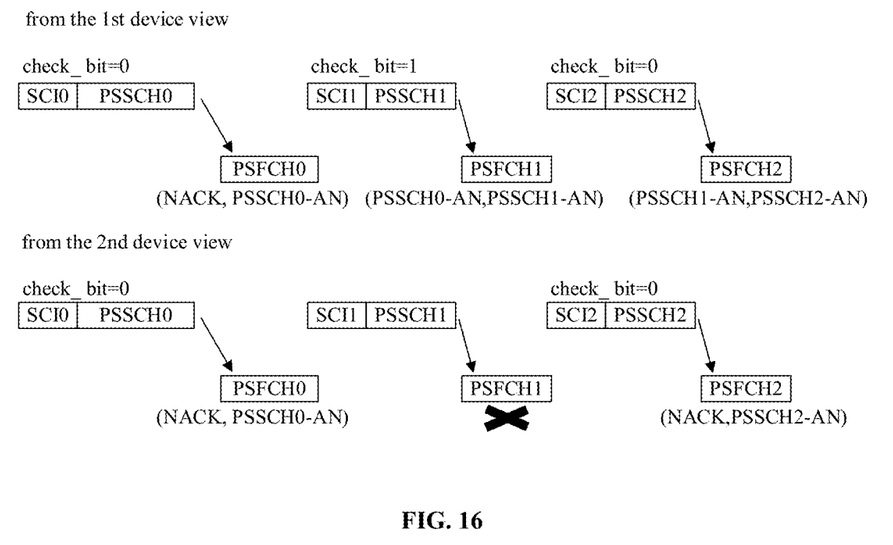
FIG. 16 is a schematic diagram illustrating an example of sidelink feedback according to an embodiment of the present disclosure.

FIG. 16 illustrates that, in some embodiments, introducing a check_bit in SCI provides a tag for the scheduled PSSCH. The AN status in the PSFCH2 should be prepared based on the check_bit. Optionally, in SCI there is an indication field bit, this example calls it check_bit, and the check_bit is corresponding to the scheduled PSSCH. The check_bit should be toggled each time for a new scheduled PSSCH. For example, if the first device transmits PSSCH0, PSSCH1 and PSSCH2, then the respective check_bits in SCI0, SCI1, SCI2 are {0,1,0} or {1, 0, 1}. In an example, in every time for a new PSSCH transmission, the corresponding check_bit is toggled (change to 0 if the previous status is 1, or change to 1 if the previous status is 0) compared to its previous transmission. then for receiving PSSCH1, the SCI1 contains the check_bit1, and for receiving PSSCH2, the SCI2 contains the check_bit2. In an example, when the second device prepares the AN feedback of PSSCH1 and PSSCH2 in PSFCH2, the device will first compare if the check_bit2 and check_bit1 have the same value, if they have the same value, it means it might be some PSSCH missed by the second device, thus the first device and the second device might have different understanding about who is PSSCH1. For this reason, the AN of PSSCH1 is set to NACK. On the other hand, if the check_bit2 and check_bit1 have different values, the second device will report the PSSCH1-AN.

In some embodiments, in a PSFCH transmission, there are AN of the current PSSCH and the latest PSSCH prior to the current PSSCH. Therefore, 2 bits are needed to reflect the AN. These 2 bits can have 4 status, i.e. {A,A}, {A,N}, {N,A}, {N,N}, where A means ACK and N means NACK. The ordering of the bits can be LSB bit is AN of the current PSSCH and MSB is the AN of the latest PSSCH prior to the current PSSCH. Optionally, the ordering can be MSB bit is AN of the current PSSCH and LSB is the AN of the latest PSSCH prior to the current PSSCH.

The 2 bits information is transmitted in a PSFCH transmission in a form of sequence s(k), where the sequence can be expressed as:

$$s(k) = b(k) * e^{\frac{j2\pi k}{N}((\alpha+\beta) \bmod N)}$$

b(k) is a base sequence, N is an integer, e.g. N=12. α is an integer and has values from 0 to N−1, and it is a cyclic shift parameter which reflects the 2 bits information relevant to the AN feedback, and β is additional generalized parameter. As a can have 12 values, this example can select 4 values out of 12 to represent {A, A}, {A, N}, {N, A}, {N, N}.

An example is that: α=0, representing {N, N}; α=3, representing {N, A}; α=6, representing {A, A}; or α=9, representing {A, N}. This example provides a robust performance. This example can be applicable to unicast communication. It is understood that, other combination is also possible.

An example applicable to multicast (group) communication is that: α=0, representing {N, N}; α=3, representing {N, −}; or α=6, representing {-, N}.

Commercial interests for some embodiments are as follows. 1. solving issues in the prior art that feedback information cannot be transmitted due to channel being busy when performing sidelink in unlicensed spectrum. 2. providing a method of acknowledgement feedback in sidelink for unlicensed system. 3. providing a method of allowing a second device to retransmit a first feedback in a next time when the second device transmits another feedback to the same first device. 4. providing a good communication performance and high reliability. 5. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. Some embodiments of the present disclosure are a combination of "techniques/processes" that can be adopted in 3GPP specification to create an end product. Some embodiments of the present disclosure could be adopted in the 5G NR unlicensed band communications. Some embodiments of the present disclosure propose technical mechanisms.

Figure 17:
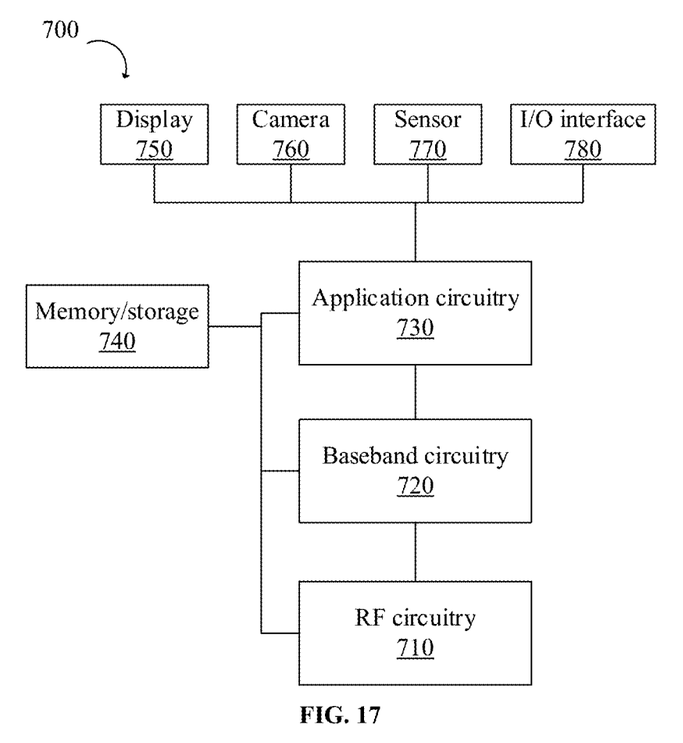
FIG. 17 is a block diagram of a system for wireless communication according to an embodiment of the present disclosure.

FIG. 17 is a block diagram of an example system 700 for wireless communication according to an embodiment of the present disclosure. Embodiments described herein may be implemented into the system using any suitably configured hardware and/or software. FIG. 17 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated. The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency. The RF circuitry 710 may enable communication with wireless networks using modulated electromagnetic radiation through a non-solid medium. In various embodiments, the RF circuitry may include switches, filters, amplifiers, etc. to facilitate the communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the application circuitry, and/or the memory/storage may be implemented together on a system on a chip (SOC). The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface. In various embodiments, the sensor 770 may include one or more sensing devices to determine environmental states and/or location first information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, a AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the state of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A method of sidelink transmission of a communication device, comprising:
receiving a first sidelink transmission and a second sidelink transmission from a first communication device; and
transmitting a first feedback of the first sidelink transmission and a second feedback of the second sidelink transmission to the first communication device, wherein the first feedback and the second feedback are transmitted in a third sidelink transmission, the third sidelink transmission comprises a first acknowledgement corresponding to the first sidelink transmission, the first sidelink transmission is located in a first set of resources, the first set of resources is indicated by a first control information, the second sidelink transmission is located in a second set of resources, and the second set of resources is indicated by a second control information, and wherein
the first acknowledgement is a negative acknowledgement (NACK) when a first indication field comprised in the first control information and a second indication field comprised in the second control information indicate a same value, and wherein the same value comprises 0 or 1, and
the first acknowledgement is an NACK or an acknowledgement (ACK) when the first indication field and the second indication field indicate different values.

2. The method of claim 1, wherein the first sidelink transmission is the last sidelink transmission received by the communication device prior to the second sidelink transmission.

3. The method of claim 1, wherein the first sidelink transmission and/or the second sidelink transmission comprises at least one of the following:
a physical sidelink shared channel (PSSCH); or
a physical sidelink control channel (PSCCH).

4. The method of claim 1, wherein the second feedback comprises an information relevant to an acknowledgement of transmission reception.

5. A communication device, comprising:
a memory;
a transceiver; and
a processor coupled to the memory and the transceiver;
wherein the processor is configured to control the transceiver to:
receive a first sidelink transmission and a second sidelink transmission from a first communication device; and
transmit a first feedback of the first sidelink transmission and a second feedback of the second sidelink transmission to the first communication device, wherein the first feedback and the second feedback are transmitted in a third sidelink transmission, the third sidelink transmission comprises a first acknowledgement corresponding to the first sidelink transmission, the first sidelink transmission is located in a first set of resources, the first set of resources is indicated by a first control information, the second sidelink transmission is located in a second set of resources, and the second set of resources is indicated by a second control information, and wherein
the first acknowledgement is a negative acknowledgement (NACK) when a first indication field comprised in the first control information and a second indication field comprised in the second control information indicate a same value, and wherein the same value comprises 0 or 1, and
the first acknowledgement is an NACK or an acknowledgement (ACK) when the first indication field and the second indication field indicate different values.

6. The communication device of claim 5, wherein the third sidelink transmission further comprises a second acknowledgement corresponding to the second sidelink transmission.

7. The communication device of claim 5, wherein the third sidelink transmission comprises a physical sidelink feedback channel (PSFCH).

8. The communication device of claim 5, wherein the third sidelink transmission is located in a third set of resources,
wherein the third set of resources is associated with the second set of resources in which the second sidelink transmission is located, wherein the association is pre-configured or pre-defined, and wherein the third set of resources is indicated by the second control information.

9. A method of sidelink transmission of a communication device, comprising:

transmitting a first sidelink transmission and a second sidelink transmission to a second communication device; and receiving a first feedback of the first sidelink transmission and a second feedback of the second sidelink transmission from the second communication device, wherein the first feedback and the second feedback are received in a third sidelink transmission, the third sidelink transmission comprises a first acknowledgement corresponding to the first sidelink transmission, the first sidelink transmission is located in a first set of resources, the first set of resources is indicated by a first control information, the second sidelink transmission is located in a second set of resources, and the second set of resources is indicated by a second control information, and wherein the first acknowledgement is a negative acknowledgement (NACK) when a first indication field comprised in the first control information and a second indication field comprised in the second control information indicate a same value, and wherein the same value comprises 0 or 1, and the first acknowledgement is an NACK or an acknowledgement (ACK) when the first indication field and the second indication field indicate different values.

10. The method of claim 9, wherein the first sidelink transmission is the last sidelink transmission transmitted by the communication device prior to the second sidelink transmission.

11. The method of claim 9, wherein the first sidelink transmission and/or the second sidelink transmission comprises at least one of the following:

a physical sidelink shared channel (PSSCH); or a physical sidelink control channel (PSCCH).

12. The method of claim 9, wherein the second feedback comprises an information relevant to an acknowledgement of transmission reception.

13. A communication device, comprising:

a memory;

a transceiver; and a processor coupled to the memory and the transceiver;

wherein the processor is configured to control the transceiver to:

transmit a first sidelink transmission and a second sidelink transmission to a second communication device; and receive a first feedback of the first sidelink transmission and a second feedback of the second sidelink transmission from the second communication device, wherein the first feedback and the second feedback are received in a third sidelink transmission, the third sidelink transmission comprises a first acknowledgement corresponding to the first sidelink transmission, the first sidelink transmission is located in a first set of resources, the first set of resources is indicated by a first control information, the second sidelink transmission is located in a second set of resources, and the second set of resources is indicated by a second control information, and wherein the first acknowledgement is a negative acknowledgement (NACK) when a first indication field comprised in the first control information and a second indication field comprised in the second control information indicate a same value, and wherein the same value comprises 0 or 1, and the first acknowledgement is an NACK or an acknowledgement (ACK) when the first indication field and the second indication field indicate different values.

14. The communication device of claim 13, wherein the third sidelink transmission further comprises a second acknowledgement corresponding to the second sidelink transmission.

15. The communication device of claim 13, wherein the third sidelink transmission comprises a physical sidelink feedback channel (PSFCH).

16. The communication device of claim 13, wherein the third sidelink transmission is located in a third set of resources, wherein the third set of resources is associated with the second set of resources in which the second sidelink transmission is located, wherein the association is pre-configured or pre-defined, and wherein the third set of resources is indicated by the second control information.

* * * * *